(12) United States Patent
Lee (10) Patent No.: US 6,502,479 B1
(45) Date of Patent: Jan. 7, 2003

(54) ADJUSTABLE RAMP HELIX

(76) Inventor: Kent Lee, 17662-82nd Way North, Maple Grove, MN (US) 55311

( * ) Notice: Subject to any disclaimer, the term of this patent is extended or adjusted under 35 U.S.C. 154(b) by 0 days.

(21) Appl. No.: 09/516,752

(22) Filed: Mar. 1, 2000

Related U.S. Application Data (60) Provisional application No. 60/122,520, filed on Mar. 3, 1999.

(51) Int. Cl.[7] .......................... F16H 55/52; F16H 55/56
(52) U.S. Cl. .......................... 74/568 R; 474/19; 474/11
(58) Field of Search .......................... 74/568 R; 474/11, 474/12, 13, 14, 19, 21, 8; 192/10 R, 54.5, 54.52, 93 A (56) References Cited

U.S. PATENT DOCUMENTS

| | | | |
|---|---|---|---|
| 2,702,484 A | | 2/1955 | Arata |
| 3,224,287 A | | 12/1965 | Gesche et al. |
| 3,380,315 A | | 4/1968 | Emerson |
| 3,967,509 A | * | 7/1976 | Teal .............................. 474/19 |
| 4,173,155 A | * | 11/1979 | Togami et al. ................. 474/19 |
| 4,378,221 A | * | 3/1983 | Huff et al. ..................... 474/19 |
| 4,523,917 A | * | 6/1985 | Schildt .......................... 474/19 |
| 4,585,429 A | * | 4/1986 | Marier .......................... 474/12 |
| 4,738,651 A | | 4/1988 | Favache et al. |
| 5,403,240 A | | 4/1995 | Smith et al. |
| 5,516,333 A | | 5/1996 | Benson |
| 5,529,544 A | * | 6/1996 | Berto ............................ 474/11 |
| 5,538,120 A | * | 7/1996 | Berardicurti ............. 192/54.52 |
| 5,692,982 A | | 12/1997 | Peterson |
| 5,720,681 A | | 2/1998 | Benson |
| 5,967,286 A | * | 10/1999 | Hokanson et al. ...... 192/110 R |
| 6,095,937 A | * | 8/2000 | Aaen ............................. 474/10 |
| 6,146,295 A | * | 11/2000 | Mor et al. ................. 474/19 X |

FOREIGN PATENT DOCUMENTS

JP 57-15143 * 1/1982

* cited by examiner

Primary Examiner—David A. Bucci
Assistant Examiner—Colby Hansen
(74) Attorney, Agent, or Firm—Vidas, Arrett & Steinkraus (57) ABSTRACT

An adjustable ramp helix is disclosed for attachment to the clutch of a snowmobile or other vehicle. The adjustable ramp helix may include a base having a throat. Extending upwardly from the base opposite to the throat may be three equally sized ramp supports where each ramp support has an adjustable ramp. Each adjustable ramp is preferably pivotally attached to the top portion of a corresponding ramp support for positioning to the interior thereof. Each of the adjustable ramps includes an arcuate foot section which passes through an arcuate aperture in the base. A threaded outer dial collar may be rotatably engaged to the throat for positioning with respect to the collar. The collar engages the arcuate foot sections of the adjustable ramps to uniformly and simultaneously elevate the adjustable ramps above the ramp supports. The elevation of the adjustable ramps provides a new angle for the bushing faces for engagement to the clutch of a vehicle to establish an alternative speed of shifting for a snowmobile or other engine. An operator may thereby adjust the speed of shifting for a snowmobile or other vehicle without disassembly of the clutch and replacement of the helix during use in high altitude, varying snow, or changing temperature conditions.

16 Claims, 6 Drawing Sheets

ADJUSTABLE RAMP HELIX

This application is based upon and claims priority to U.S. Provisional Patent Application No. 60/122,520 filed Mar. 3, 1999, which is incorporated herein by reference.

BACKGROUND OF THE INVENTION

Snowmobile clutch and transmission systems as known are not versatile to provide maximum performance in varying conditions as related to altitude, snow depth, and/or temperature. As such, optimal shifting performance for the snowmobile has not been obtained because snowmobile transmissions frequently shift gears early or late, thereby adversely affecting the performance of the sled.

In the past, to attempt to minimize shifting problems a snowmobile operator purchased a number of helix devices, where each different helix device had inclined ramps of a desired set angle. The helix devices when engaged to a clutch, provided a desired speed of shifting of the gears of the snowmobile or other vehicle. These independent helix devices allowed an operator to disassemble the clutch to replace the helix for operation within varying altitude, snow, and temperature conditions, to attempt to maximize the performance of the snowmobile clutch and snowmobile.

In the past, operators have frequently expended significant periods of time, which may have been in excess of one hour or more, in cold weather conditions, tearing down and reassembling a snowmobile clutch for replacement with a helix having a desired angle of incline for the stationary ramps in anticipation of future weather, temperature, and/or altitude conditions. Operators were thereby required to predict weather and snow conditions which frequently resulted in the failure to select the optimal helix for use in the anticipated conditions. In addition, changes in weather during a day often necessitated the changing of a helix to optimize sled or vehicle performance. Further, changes in altitude during a day or trip also necessitated a change or replacement of a helix to optimize snowmobile or vehicle performance.

Significant time and expense is required to replace a helix for the clutch of a vehicle. It is also inconvenient to carry a number of helixes during a snowmobile trip for replacement to accommodate varying altitude, snow, and/or temperature conditions. A need therefore exists to provide an adjustable ramp helix which may be easily and conveniently modified to minimize maintenance and down time for a vehicle. Differing snow and temperature conditions also affect the transmission of a snowmobile as to how fast or how slow the shifting of the gears should occur. It is difficult to carry within a snowmobile glove box the tools and replacement helixes necessary to disassemble and replace the helix for a clutch during snowmobiling activities.

GENERAL DESCRIPTION OF THE INVENTION

An adjustable ramp helix is disclosed for attachment to the clutch of a snowmobile or other vehicle. The adjustable ramp helix may include a base having a throat having threaded and non-threaded section's. Extending outwardly from the base opposite to the throat may be three equally sized ramp supports where each ramp support has an adjustable ramp. The adjustable ramps may be pivotally attached to the top portion of each of the ramp supports for positioning to the interior thereof. Each of the adjustable ramps preferably includes an arcuate foot section which passes through an arcuate aperture in the base. An elevator or outer dial collar may be rotatably engaged to the threaded section of the throat for positioning with respect to the base. The elevator or collar engages the arcuate foot sections of the adjustable ramps to uniformly and simultaneously elevate the adjustable ramps above the production ramp supports to provide a desired ramp angle for engagement to the vehicle clutch. A modified shift speed for the snowmobile or other engine is thereby provided. An operator may adjust the shift speed for a snowmobile or other vehicle without disassembly of the clutch and replacement of the helix during use in high altitude, varying snow, or changing temperature conditions. An operator may position the elevator or rotate the outer dial collar to elevate or lower the feet and adjustable ramps to alter the angle of incline for the adjustable ramps either upwardly or downwardly. This elevation or lowering of the angle of incline for the adjustable ramps alters the rate or speed at which the clutch shifts into a different gear during use of the snowmobile or vehicle.

An advantage of the present invention is the provision of an adjustable ramp helix of relatively simple and inexpensive design, construction, and operation which provides adjustable shifting ratios without fear of injury to persons and/or damage to the transmission of a snowmobile.

Another advantage of the present invention is the provision of an adjustable ramp helix which may be easily and conveniently manipulated to maximize performance of a snowmobile clutch within varying snow conditions.

Still another advantage of the present invention is the provision of an adjustable ramp helix which may be easily and conveniently manipulated to maximize performance of a snowmobile clutch within varying temperature conditions.

Still another advantage of the present invention is the provision of an adjustable ramp helix which may be easily and conveniently manipulated to maximize performance of a snowmobile clutch within varying altitude conditions.

Still another advantage of the present invention is the provision of an adjustable ramp helix which minimizes maintenance or down time when an operator desires to modify the angle of incline for the adjustable ramps and thereby alter the speed of the shifting of the snowmobile transmission during use of a snowmobile.

Still another advantage of the present invention is the provision of adjustable ramps which maximize enjoyment and minimizes frustration of a snowmobile operator during use of a snowmobile.

Still another advantage of the present invention is the provision of adjustable ramps which provide a ramp incline angle of between 20° and 80° within a single helix.

Still another advantage of the present invention is the provision of adjustable ramps which may accommodate uniformly horizontally arcuate ramps or variable inclined ramps at the discretion of an individual.

Still another advantage of the present invention is the provision of adjustable ramps which permit the simultaneous selection of variable angles of incline for the adjustable ramps without the necessity to continuously replace the helix as used on a snowmobile.

A feature of the present invention is the provision of an adjustable ramp helix having a base having a throat having threaded and non-threaded sections and an elevator or outer dial collar which permits an individual to easily select and simultaneously adjust the incline of the adjustable ramps of the helix as engaged to the clutch for shifting of the gears of a snowmobile.

Another feature of the present invention is the provision of an adjustable ramp helix attached to the clutch of a snowmobile which eliminates the necessity to disassemble the clutch and replace the helix to alter the speed of shifting of the sled during use.

Still another feature of the present invention is the provision of an adjustable ramp helix having three uniformly spaced and sized ramp supports where each ramp support includes a preselected stationary angle of incline which is identical to the initial angle of incline of the adjustable ramps.

Still another feature of the present invention is the provision of an adjustable ramp helix having adjustable ramps pivotally attached to the top portion of each of the ramp supports.

Still another feature of the present invention is the provision of an adjustable ramp helix having adjustable ramps positioned to the interior of the ramp supports.

Still another feature of the present invention is the provision of adjustable ramps each having an arcuate foot section adapted for engagement to the elevator or outer dial collar for simultaneously altering the angle of incline of the adjustable ramps relative to the ramp supports during positioning of the elevator or rotation of the outer dial collar.

Still another feature of the present invention is the provision of an adjustable ramp helix having a base having three uniformly spaced and sized arcuate shaped cutout apertures adapted to each receive an arcuate foot of a corresponding adjustable ramp.

Still another feature of the present invention is the provision of an adjustable ramp helix where each arcuate foot has a bottom having a first flat surface, a second incline surface, and a transition point, where the arcuate foot is adapted to engage the elevator or outer dial collar during positioning of the elevator or rotation of the outer dial collar to adjust the angle of incline of the adjustable ramps relative to the ramp supports during use of a snowmobile.

Still another feature of the present invention is the provision of an adjustable ramp helix where three adjustable ramps are simultaneously and uniformly elevated relative to the adjacent ramp supports for engagement to a clutch to establish a desired rate of shifting for a snowmobile without disassembly of the clutch and replacement of the helix during use in high altitude, varying snow, and/or changing temperature conditions.

DETAILED DESCRIPTION OF THE PREFERRED EMBODIMENT

Figure 1:
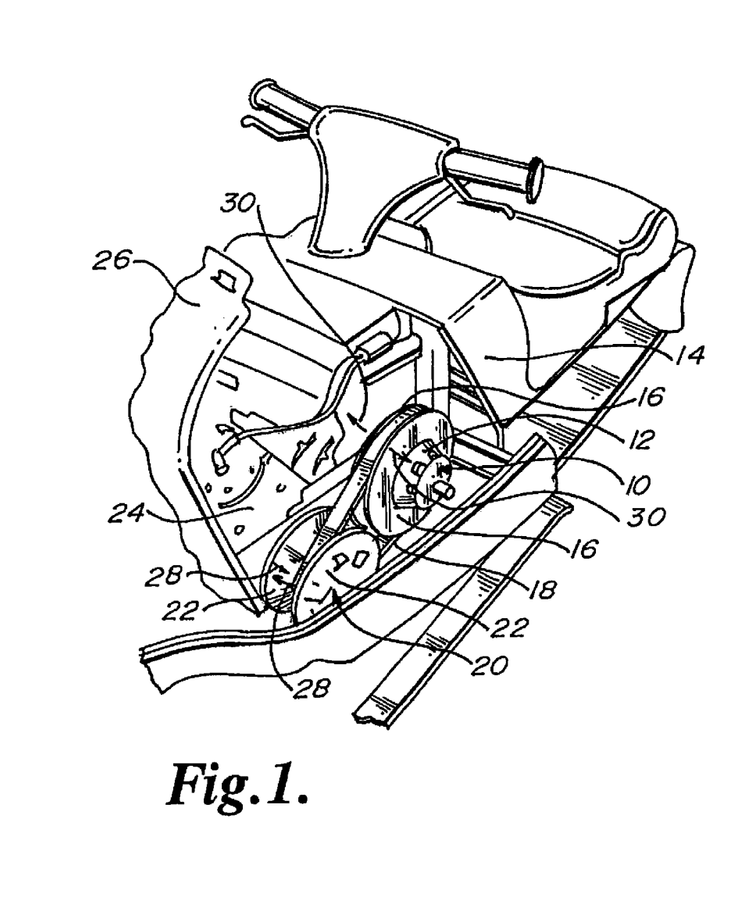
FIG. 1 is an environmental view of a snowmobile and clutch mechanisms.

An adjustable ramp helix is illustrated and described herein. The adjustable ramp helix is generally referred to by the numeral 10. As seen in FIG. 1, the adjustable ramp helix is preferably engaged to the driven or secondary clutch 12 of a snowmobile 14. The driven or secondary clutch 12 preferably includes a pair of sheaves 16 which are engaged to a V-belt 18. The V-belt 18 is further engaged to a front clutch 20 having a pair of sheaves 22. The sheaves 22 are preferably engaged to the engine 24 via a shaft not shown.

As may be seen in FIG. 1, the adjustable helix is preferably engaged to the exterior of the driven or secondary clutch 12 and is positioned below the clutch and belt guard 26 of the snowmobile. An individual may therefore obtain access to the adjustable ramp helix by lifting the clutch and belt guard 26 as is apparent in FIG. 1.

Figures 2, 4:
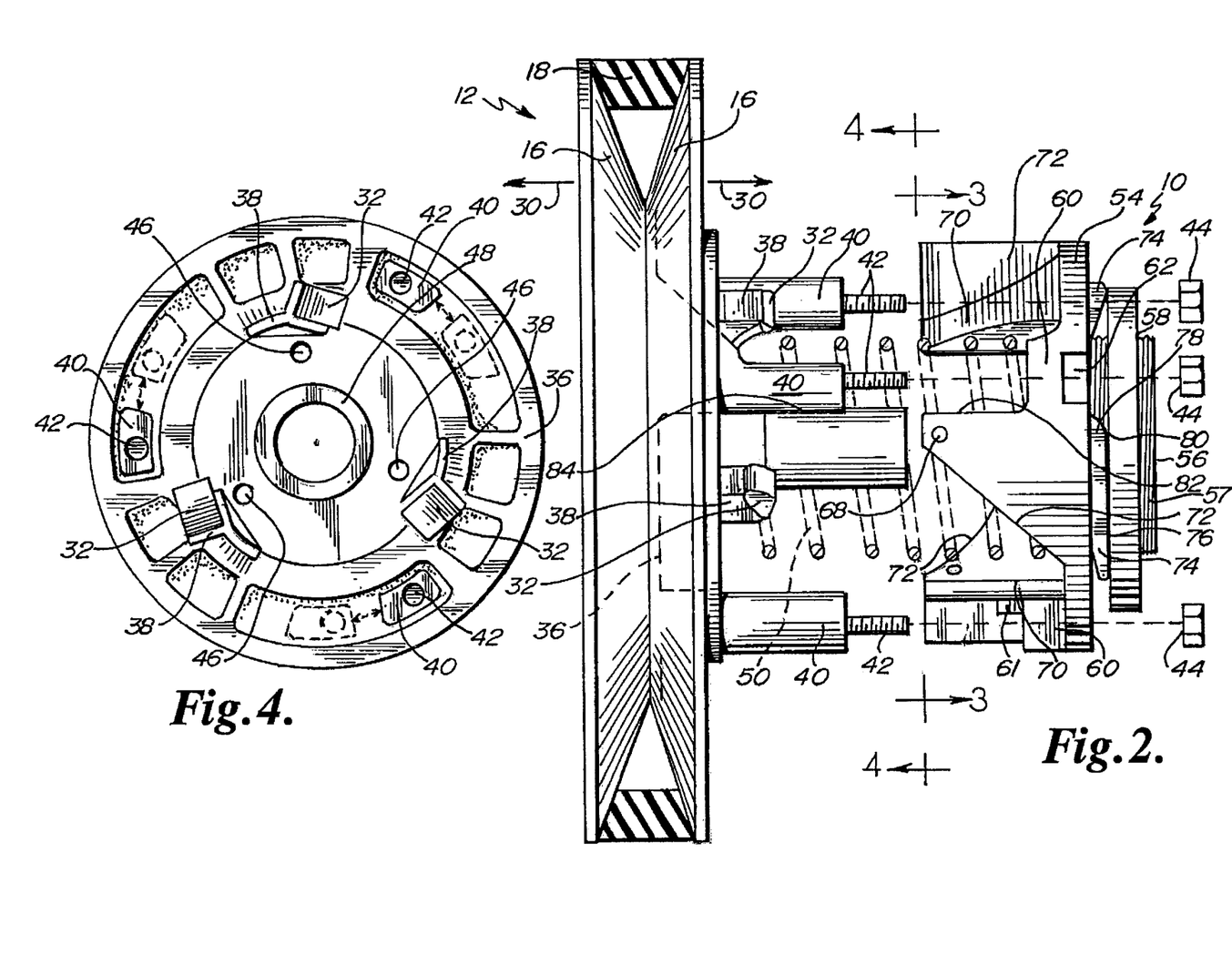
FIG. 2 is an exploded side view of the adjustable helix as engaged to the driven or secondary clutch.
FIG. 4 is a top view of the hub of the driven or secondary clutch taken along the line of 4—4 of FIG. 2.

As is seen in FIG. 1, when the snowmobile 14 is in neutral, the V-belt 18 is positioned outwardly and is adjacent to the exterior circumference of the sheaves 16 of the driven or secondary clutch 12. During operation of the snowmobile 14, as power is applied to the engine 24, throw weights which are integral to the drive clutch act to squeeze the sheaves 22 toward each other as depicted by arrows 28. The squeezing of the sheaves 22 of the drive clutch in turn move the V-belt 18 outwardly toward the exterior circumference of the sheaves 22 of the drive clutch 20. The movement of the V-belt 18 outwardly relative to the sheaves 22 in turn causes the V-belt 18 to be drawn inwardly relative to the sheaves 16 of the driven or secondary clutch 12. The sheaves 16 of the driven or secondary clutch 12 then separate as depicted by arrows 30. The separation of the sheaves 16 outwardly as identified by arrow in turn causes bushings 32 to engage the adjustable ramps 70 to move bushings 32 upwardly along the adjustable ramps 70 to shift gears for the snowmobile 14 (FIGS. 1, 2, and 4).

The production incline for the helix assists in determining the speed of shifting for the snowmobile engine 24.

The incline of the helix is important for the selection of the speed of shifting for the snowmobile 14. An increase or decrease of the incline of the helix results in corresponding changes to the shift speed for snowmobile 14. Generally, the incline for the helix varies at increments of 2° between 20° and 80° upwardly from horizontal. The incline of the helix determines how fast the transmission of the snowmobile 14 shifts gears. At lower elevations or flatter terrains, steeper angles of incline are desired for the helix. At higher elevations or steeper terrains, lower angles of incline for the helix are preferred. In general, at a lower elevation of between 0 to 4,000 feet above sea level an incline for the helix of approximately 50° upwardly from horizontal is desired. At an elevation between 4,000 and 8,000 feet the preferred desired incline for the helix is approximately 47.5° upward from horizontal. At elevations between 8,000 to 12,000 feet the preferred angle of incline for the helix is approximately 45° upwardly from horizontal. It should be noted that the angles of incline described herein have been provided for illustrative purposes only and may vary considerably at the discretion of an individual. It should also be noted that the elevation above sea level is not the only factor for selection of an angle of incline for the helix. If a snowmobile is to be used in very hilly terrains, then an individual may desire that a lower angle of incline be provided for the helix. Also, it should be noted that the snow conditions and temperature also are factors to consider when selecting a desired angle of incline for a helix.

During use of the snowmobile 14, the bushings 32 are continually riding upwardly and downwardly along the incline of the adjustable ramps 70 based upon the level of throttle selected by the snowmobile operator. During use of the snowmobile 14 on steep hills, it is desirable that the angle of incline of the adjustable ramps 70 be relatively flat to facilitate slower shifting of the gears to avoid the engine 24 from becoming bogged down. An operator may thereby easily maintain a higher level of RPM for the engine 24. On more even terrain, it is desirable to have a relatively steep incline for the adjustable ramps 70 to facilitate a faster shifting of the transmission to maintain maximum performance and RPM's for the snowmobile engine 24.

During use of a snowmobile 14 in mountainous regions, the angle of incline for the adjustable ramps 70 is preferably higher at lower elevations where a snowmobile engine 24 typically has more power. At higher altitudes, a snowmobile engine 24 typically has 35% less horsepower; therefore, the angle of incline for the adjustable ramps 70 is required to be less steep to facilitate slower shifting of the transmission. If no change is made to the angle of incline for the adjustable ramps 70 between varying altitude conditions, the snowmobile transmission and driven or secondary clutch 12 will shift even if the power for the engine 24 is unavailable, resulting in the engine bogging down causing frustration to an operator. A steeper angle of incline for the adjustable ramps 70 typically results in faster shifting by the transmission which in turn increases the difficulty to hold a desired RPM for the engine 24, in turn increasing the possibility of the snowmobile 14 becoming stuck in deep snow. The flatter or lower of the angle of incline for the adjustable ramps 70, the slower the transmission will shift up a gear and the faster the transmission will downshift. For running in deep snow, a snowmobile engine 24 frequently needs to quickly back shift; therefore, a flatter angle of incline for the adjustable ramps 70 is desired. The steeper the incline for the adjustable ramps 70, the faster the snowmobile engine 24 shifts up a gear and the slower the engine 24 back shifts and vice versa. When operating in high altitude conditions, it is desirable to quickly downshift in order to maintain a desired level of RPM's for the engine.

In general, the driven or secondary clutch 12 includes a hub 36. Extending upwardly from the hub 36 are preferably three bushing chairs 38. Each bushing chair 38 preferably includes a bushing 32 which engages the adjustable ramps 70. The bushing chairs 38 are preferably uniformly spaced about the circumference of a circle within the interior of the hub 36. The hub 36 surrounds the shaft 48 and spring 50 of the snowmobile 14 (FIGS. 2 and 4).

Three clutch pillars 40 also preferably extend upwardly from the hub 36. Each clutch pillar 40 preferably has a threaded post 42 which is adapted to engage a nut 44 which in turn is used to attach the adjustable helix to the hub 36. The clutch pillars 40 are preferably uniformly and regularly spaced about the circumference of the hub 36.

Three spring retainers 46 are preferably regularly and uniformly spaced about the hub 36 exterior to the shaft 48. Each of the spring retainers 46 is preferably adapted to receive a first affixation tab of the spring 50 to prevent rotation of the spring 50 relative to the hub 36. The spring 50 is preferably a torsion spring having any desired coil strength as preferred by an individual. The spring 50 is preferably engaged to the hub 36 and adjustable ramp helix to prevent snapping or slapping of the helix following shifting of the transmission for the snowmobile 14. It should also be noted that the spring 50 preferably regulates the speed of shifting of the transmission of the snowmobile 14 during use. The plurality of spring retainers 46 within the hub 36 enable varying tensions to be selected for placement on the spring 50 during assembly and affixation of the adjustable ramp helix to the driven or secondary clutch 12. Generally, the spring 50 as engaged to the hub 36, is rotated and/or compressed one-third turn during affixation of the adjustable ramp helix to the clutch pillars 40.

Figures 3, 7:
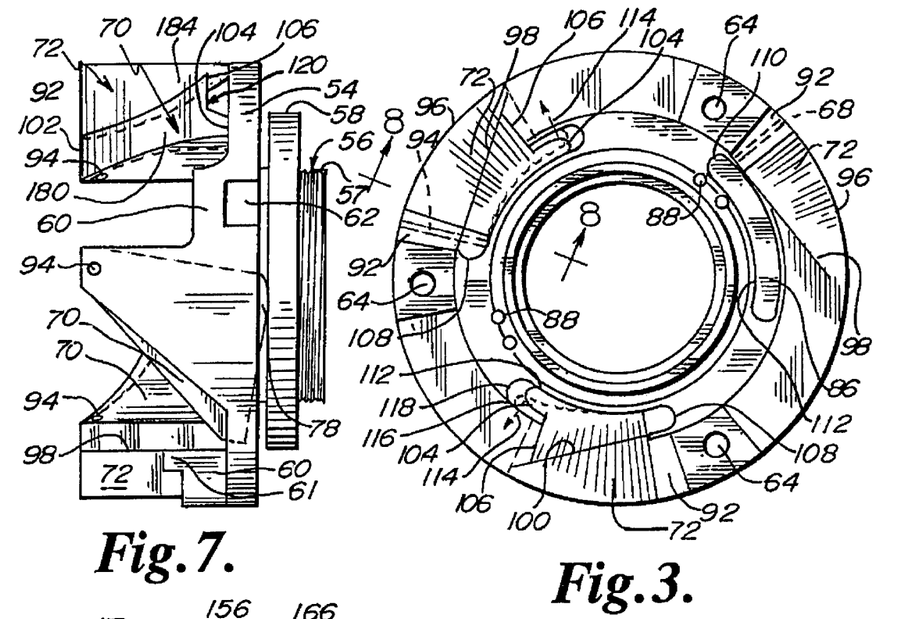
FIG. 3 is a top view of the adjustable helix taken along the line of 3—3 of FIG. 2.
FIG. 7 is a side view of the adjustable helix.
Figure 6:
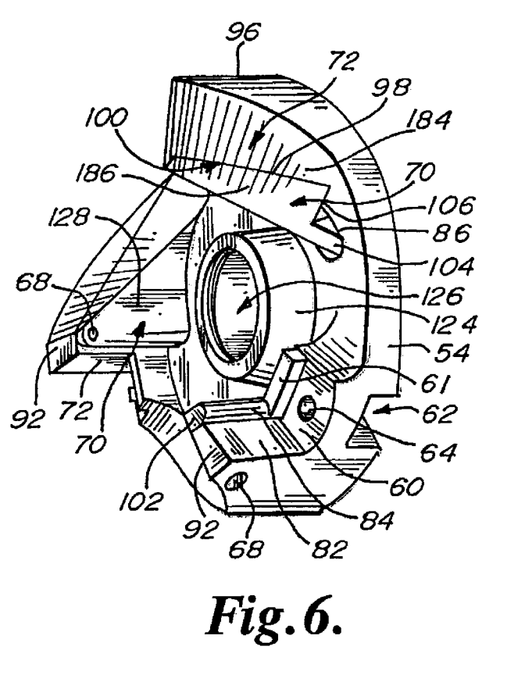
FIG. 6 is an isometric detail view of the adjustable helix.

As seen in FIG. 2, the adjustable ramp helix is formed of a base 54. Extending outwardly from the base 54 is preferably a throat 56 which is preferably adapted to receivingly engage an elevator or outer dial collar 58. The throat 56 may have a threaded section 57. The elevator or outer dial collar 58 may completely or partially surround the throat 56. The base 54 also preferably includes three regularly spaced and equally sized affixation ledges 60. Adjacent each affixation ledge 60 is preferably a cut-away channel 62. Each affixation ledge 60 preferably includes an aperture 64 therethrough (FIGS. 3 and 6). Each affixation ledge 60, cut-away channel 62, and aperture 64 is preferably adapted to receivingly engage a threaded post 42 for affixation of the adjustable helix to the driven or secondary clutch 12.

Each affixation ledge 60 may also include a positioning wall 61 which is preferably adapted to be placed to the interior of, and adjacent to, the top of a corresponding clutch pillar 40 during engagement of the adjustable ramp helix to the driven or secondary clutch 12. The vertical rear edges 82 of the ramp supports 72 are preferably adapted for positioning adjacent to a corresponding vertical edge 84 of a corresponding clutch pillar 40. The cut-away channels 62 are also preferably sized to receivingly permit rotation of a nut 44 during secure affixation of the adjustable helix 10 to the driven or secondary clutch 12.

Figures 13, 14, 15, 16:
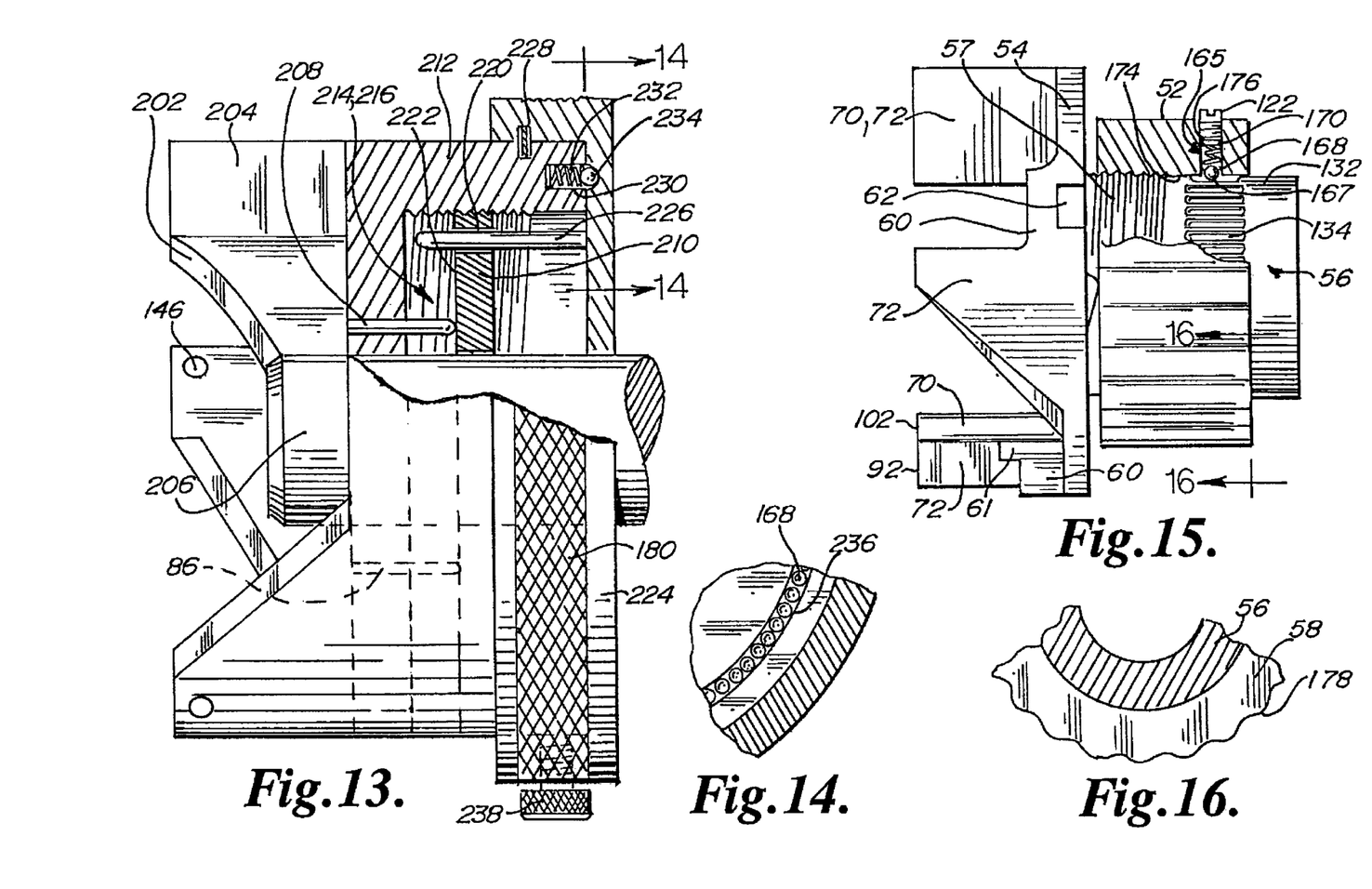
FIG. 13 is an alternative side partial cutaway view of an adjustable helix.
FIG. 14 is an alternative detail cross-sectional view of the collar and throat taken along the line of 14—14 of FIG. 13.
FIG. 15 is an alternative side view of the adjustable helix.
FIG. 16 is an alternative detail cross-sectional view of the collar and throat taken along the line of 16—16 of FIG. 15.
Figure 17:
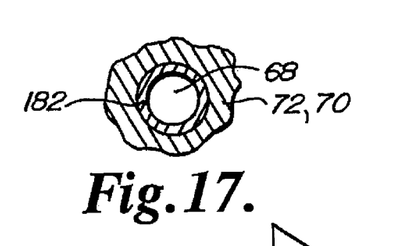
FIG. 17 is a detail cross-sectional side view of the aperture taken along the line of 17—17 of FIG. 13.

Extending outwardly from the threaded section 57 of the throat 56 is preferably a non-threaded surface 132. The non-threaded surface 132 is preferably utilized as an area to provide releasable affixation between the outer dial collar 58 and the throat 56 following elevation or lowering of the adjustable ramps 70 to a desired angle relative to the ramp supports 72. The use of the non-threaded surface 132 preferably minimizes risk of damage to the threaded section 57 of the throat 56 during affixation of the outer dial collar 58 at a desired rotational position relative to the throat 56 during use of the adjustable helix 10. (FIGS. 15 and 16.)

The non-threaded surface 132 may include a plurality of regularly spaced recessed grooves 134. The recessed grooves 134 may be regularly spaced along the non-threaded surface 132 to provide for elevation and/or lowering of the angle of incline of the adjustable ramps 70 relative to the ramp supports 72 at any increment as desired by an individual. It is anticipated that the desired spacing of the recessed grooves 134 about the non-threaded surface 132 provides elevation and/or decent of the adjustable ramps 70 at 2° increments relative to the ramp supports 72. Alternatively, the non-threaded surface 132 may contain a plurality of retaining recesses. The retaining recesses, like the longitudinally extending recessed grooves 134 are preferably adapted to receive a positioner 165 which is used to secure the outer dial collar 58 at a desired rotational position relative to the throat 56. The retaining recesses are also preferably regularly spaced along the non-threaded surface 132 to provide for elevation and/or lowering of the angle of incline for the adjustable ramps 70 relative to the ramp supports 72 at any increment as desired by an individual. It is anticipated that the spacing of the retaining recesses about the non-threaded surface 132 provides for elevation and/or decent of the adjustable ramps 70 at 2° increments relative to the ramp supports 72.

The retaining recesses or recessed grooves 134 may be regularly spaced along the exterior of the non-threaded surface 56 in any desired pattern and/or configuration as desired by an individual. It should be noted that the retaining recesses may be configured in an arcuate shape and/or spiral along the non-threaded surface 132. It should also be noted that a plurality of patterns may be provided for the retaining recesses and/or recessed grooves 134 about the non-threaded surface 132 as desired by an individual. An individual may simultaneously use recessed grooves 134 and/or retaining recesses without sacrificing the essential functions, features, and attributes described herein.

In an alternative embodiment, the non-threaded surface 132 may not include recessed grooves 134 and/or retaining recesses. In this embodiment, the non-threaded surface 132 is adapted to receive the positioner 165 through the use of compression which in turn may secure the outer dial collar 58 at a desired rotational position relative to the throat 56. In this embodiment the positioner 165 may be a screw having a nylon end which may be utilized to releasably secure the outer dial collar 58 at a desired rotational location relative to the throat 56, which in turn releasably secures the adjustable ramps 70 at a desired angle of incline relative to the ramp supports 72.

It is anticipated that the throat 56 will include an outwardly extending non-threaded surface 132 which may be utilized for engagement to the positioner 165. Alternatively, the non-threaded surface 132 may be eliminated from the throat 56 as described herein.

The outer dial collar 58 may include an interior surface 174. In one embodiment a plurality of apertures 176 may traverse the outer dial collar 58. The plurality of apertures 176 are preferably adapted to each receive a positioner 165 utilized to secure the outer dial collar 58 at a desired rotational position relative to the throat 56. The apertures 176 may be further adapted to include a detente recess 168 proximate to the interior surface 174. The apertures 176 and positioners 165 may be regularly spaced about the outer dial collar 58 to facilitate releasable engagement to the throat 56.

The positioners 165 may include detente balls 166, pins, or set screws 122, at the preference of an individual. Alternative devices may be used as the positioners 165 described herein provided that the essential functions, features, and attributes for the adjustable helix are not sacrificed.

Positioners 165 such as set screws 122 may traverse the exterior surface of the outer dial collar 58. Interior to the apertures 176 may also be positioned a spring 170 which may further engage a detente ball 166 and/or pin. The rotation of the positioner 165, or set screw 122 preferably compresses the spring 170 which, in turn, tightens the contact between the detente ball 166 and/or pin to the non-threaded surface 132. The positioner 165, or set screw 122 should not be tightened to restrict rotation of the outer dial collar 58 relative to the throat 56 until such time as the detente balls 166 and/or pins are aligned with the recessed grooves 134 and/or retaining recesses. Following mating engagement of the detente balls 166 within the recessed grooves 134 or the insertion of the pins within the retaining recesses, the positioner 165, or set screw 122, may be further tightened to prevent inadvertent and/or undesirable rotation of the outer dial collar 58 relative to the throat 56. To effectuate rotation of the outer dial collar 58 relative to the throat 56 an individual may manipulate and release the positioner 165 and/or set screw 122 to remove tension from the compressed spring 170. The reduction of tension upon the spring 170 permits the detente balls 166 and/or pins to separate from the recessed grooves 134 and/or retaining recesses permitting rotation of the outer dial collar 58 relative to the throat 56.

It should be noted that the use of detente balls 166 and/or pins may be eliminated provided that the positioner 165 and/or set screw 122 is of sufficient length for engagement to the throat 56 and preferably to the non-threaded surface 132. Alternatively, the distal end of the positioner 165 and/or set screw 122 may include a nylon engagement edge which may frictionally bind the non-threaded surface 132 restricting rotation of the outer dial collar 58 relative to the throat 56. As noted above, the apertures 176 may be threaded to receive a threaded positioner 165 permitting rotation therebetween. In this embodiment the positioner 165 or set screw 122 may have an elevated position which permits rotation of the outer dial collar 58 relative to the throat 56 to an engaged position which secures the outer dial collar 58 to the throat 56.

It should be noted that the use of a set screw 122 and/or other tightening device may be eliminated at the discretion of an individual. In this embodiment, the outer dial collar 58 may include a plurality of regularly spaced detente and/or pin recesses 168. A cavity may be integral to the base 54 to hold a spring 170 and a detente ball 166. The detente ball 166 and/or pin may be engaged to the distal end of the spring 170 for compression relative to the non-threaded surface 132. The compression of the spring 170 is preferably of a sufficient force to urge the detente balls 166 and/or pins outwardly for engagement within the pin recesses 168 to secure the outer dial collar 58 to the throat 56.

Any desired affixation member may be utilized by an individual provided that the releasable rotation of the outer dial collar 58 relative to the throat 56 is provided herein.

The positioner 165 and/or set screws 122 may traverse the outer surface of the outer dial collar 58 to facilitate access by an individual to permit rotation of the outer dial collar 58 relative to the throat 56.

The regularly spaced recessed grooves 134 may also be adapted to receive the detente balls 166. A spring 170 may be positioned proximate to each of the detente balls 166. The springs 170 preferably engage the detente balls 166 to urge the detente balls 166 outwardly into the regularly spaced recessed grooves 134 to releasably secure the outer dial collar 58 at a desired rotational position relative to the threaded throat 56. During rotation of the outer dial collar 58 relative to the throat 56 it is anticipated that the springs 170 will expand urging the detente balls 166 outwardly to ride upon the non-threaded surface 132 until such time as positioning within another recessed groove 134 becomes available.

The retaining recesses may be adapted to receive pins which are engaged to the outer dial collar 58. The pins are preferably positioned proximate to the interior surface 174 of the outer dial collar 58. The pins may also be engaged to springs 170 which may be utilized to urge the pins outwardly to engage the non-threaded surface 132 until such time as alignment with the retaining recesses becomes available for releasable positioning of the outer dial collar 58 at a desired rotational position relative to the throat 56.

The outer dial collar 58 preferably includes an outer circumference which may have recessed portions 178 which may be utilized by an individual to facilitate grasping for rotation of the outer dial collar 58 relative to the throat 56. Alternatively, the exterior surface of the outer dial collar 58 may include knurled sections 180 to facilitate grasping by an individual for rotation of the outer dial collar 58 relative to the throat 56.

Extending outwardly from the base 54 opposite to the throat 56 are preferably three uniformly shaped and regularly spaced ramp supports 72. Each of the ramp supports 72 include an aperture 68 therethrough adjacent to the top. An adjustable ramp 70 is preferably pivotally engaged to each of the ramp supports 72.

A transition member 73 may be positioned between each adjustable ramps 70 and the outer dial collar 58. The transition member 73 may be a foot 74 or a elevator pin 164. The transition member 73 preferably provides the mechanism for elevation of the adjustable ramps 70 relative to the ramp supports 72 during use of the adjustable ramp helix 10.

Each adjustable ramp 70 may include a foot 74 having a first flat surface 76, a second inclined surface 78, and a transition point 80 between the first flat surface 76 and the second inclined surface 78.

The adjustable ramps 70 are preferably pivotally engaged to a corresponding ramp support 72 via a nut and bolt, pin, or set screw which is positioned within an aperture 68. A bushing 182 is preferably positioned within the apertures 68 to facilitate pivotal interaction between the adjustable ramps 70 and the ramp supports 72. The bushings 182 may be formed of any material as desired by an individual including, but not limited to, Teflon and/or plastics to reduce friction between the nut, pin, or set screw and the aperture 68. The adjustable ramp helix preferably includes three identically sized, spaced and shaped ramp supports 72 having adjustable ramps 70 positioned about the circumference of the adjustable ramp helix 10.

Referring to FIGS. 3, 5, 6, and 7, the base 54 of the adjustable ramp helix 10 preferably includes three identically shaped, sized, and regularly spaced arcuate or kidney shaped apertures 86 which are oversized relative to the feet 74 of the adjustable ramps 70. Each arcuate or kidney shaped aperture 86 is preferably adapted to receive a corresponding foot 74 of a ramp support 70. The base 54 of the adjustable ramp helix also preferably includes a plurality of spring retainers 88 which are adapted to engage second tabs of the spring 50. The top view of the adjustable ramp helix shows that each ramp support 72 preferably includes a top shelf 92 and the aperture 68 which is adapted to receive a nut and bolt, pin, or set screw 94 to pivotally affix the adjustable ramps 70 to the ramp supports 72. (FIGS. 3 and 6.)

As may be seen in FIG. 3, each ramp support 72 includes an adjustable ramp 70. Each ramp support 72 preferably has an arcuate exterior edge 96 and a substantially straight interior edge 98 as may be seen in FIG. 6. Each ramp support 72 also preferably has a bushing face 184 which is preferably arcuate laterally or curved inwardly. Each ramp support 72 is also simultaneously arcuate vertically, descending inwardly and downwardly over a curve having a preselected shape from the top shelf 92 to the base 54. As may be further seen from FIG. 6, the ramp supports 72 have their widest width dimension proximate to the top shelf 92 and the smallest width dimension proximate to the base 54. The shape selected for the adjustable ramps 70 and/or ramp supports 72, may have any rotational, twisting, and/or spiral incline as desired. The angle of incline for the adjustable ramps 70 and/or ramp supports 72 may vary between the base 54 and the portion of the ramp support 72 proximate to the top shelf 92. As such, the angle of incline for the adjustable ramps 70 and/or ramp supports 72 may be consistently uniform, regularly curved, or variable at the discretion of an individual. (FIGS. 7, 6, 12A–12D.)

In an alternative embodiment, the adjustable ramps 70 and/or ramp supports 72 may have a relatively smaller incremental increase or decrease in the angle of incline adjacent to the base 54. Also, the adjustable ramps 70 and/or ramp supports 72 may have a larger or steeper incremental increase or decrease in the angle of incline adjacent to the top shelves 92. The variable angle of incline of the adjustable ramps 70 and/or ramp supports 72 is preferably in addition to the arcuate interior curve for the shape of each adjustable ramp 70 and/or ramp support 72.

The straight interior edges 98 of the ramp supports 72 preferably represent a vertical wall which is perpendicular to the base 54. The vertical wall of the ramp supports 72 are preferably of sufficient strength to counter the outward centrifugal forces of the adjustable ramps 70 during rotation of the driven or secondary clutch 12. The vertical wall preferably supports the adjacent wall 100 to prevent or prohibit outward movement of the adjustable ramps 70 relative to the ramp supports 72 due to centrifugal forces which are exposed to the adjustable helix during rotation of the driven or secondary clutch 12 during use of a snowmobile 14.

The adjustable ramps 70 preferably include a straight adjacent wall or edge 100 which is another substantially vertical wall positioned adjacent to the straight interior edge 98 of a corresponding ramp support 72. As may be seen in FIGS. 6 and 7, the straight interior edge 98 and the straight adjacent wall or edge 100 are not arcuate laterally to coincide with the arcuate shape of the combined ramp supports 72 and adjustable ramps 70. The straight interior edge 98 and the straight adjacent wall or edge 100 preferably traverses the overall arcuate shape of the ramp supports 72 along a straight line. The straight interior edge 98 and straight adjacent wall or edge 100 preferably initiate proximate to the top shelf 92 of the ramp supports 72 and the top shelf 102 of the adjustable ramps 70 extending downwardly in a straight line crossing the arcuate shape of the ramp supports 72 toward the base 54. The straight interior edge 98 and the straight adjacent wall or edge 100 preferably terminate proximate to the base 54 defining the leading edge 106 and the horizontal shelf 120. The horizontal shelves 120 are the underside of the adjustable ramps 70 which are adapted for flush engagement to the base 54, or for elevation with respect thereto, via the rotatable inward positioning of the outer dial collar 58 which in turn elevates the feet 74 and the adjustable ramps 70 above the ramp supports 72. The adjustable ramps 70 also preferably include a top shelf 102, a forward tang 104, and a leading edge 106. The adjustable ramps 70 also preferably include a rear arcuate edge 108. The rear arcuate edge 108 is preferably adapted for positioning adjacent to the rear edge 110 of the arcuate or kidney-shaped apertures 86 when the adjustable ramps 70 are in flush alignment with the ramp supports 72 defining a first position. In this first position, each adjustable ramp 70 has the identical shape of the corresponding ramp support 72 representing a smooth transition therebetween (FIG. 6). In this first position, the forward tang 104 is preferably positioned adjacent to and in contact with the interior edge 112 of the arcuate or kidney-shaped apertures 86. It should be noted that the arcuate or kidney-shaped apertures 86 are preferably oversized relative to the feet 74 of the adjustable ramps 70.

Each of the adjustable ramps 70 preferably has a second bushing face 186. (FIGS. 6 and 7). The second bushing face 186 is also arcuate laterally and is simultaneously arcuate vertically, descending inwardly and downwardly having a pre-selected shape from the top shelf 102 to the leading edge 106. The adjustable ramps 70 have their narrowest width dimension proximate to the top shelf 102 and the largest width dimension proximate to the leading edge 106. The shape selected for the adjustable ramps 70 and second bushing faces 186 may have any rotational, curved, twisting, and/or spiral incline as desired for flush alignment with the first bushing face 184 when in the first position. The angle of incline for the adjustable ramps 70 may also vary between the portion of the adjustable ramps 70 adjacent to the leading edge 106 and the portion of the adjustable ramps 70 proximate to the top shelf 102. The angle of incline for the adjustable ramps 70 may also be consistently uniform y regularly curved, or variable at the discretion of an individual. (FIGS. 6, 7, 12A–12D). The adjustable ramps 70 may further have a relatively smaller incremental increase or decrease in the angle of incline adjacent to the leading edge 106. Also, the adjustable ramps 70 may have a larger or steeper incremental increase or decrease in the angle of incline adjacent to the top shelf 102. The variable angle of incline for the adjustable ramps 70 are preferably in addition to the arcuate interior curve for the shape of each adjustable ramp 70 and second bushing face 186.

Figure 5:
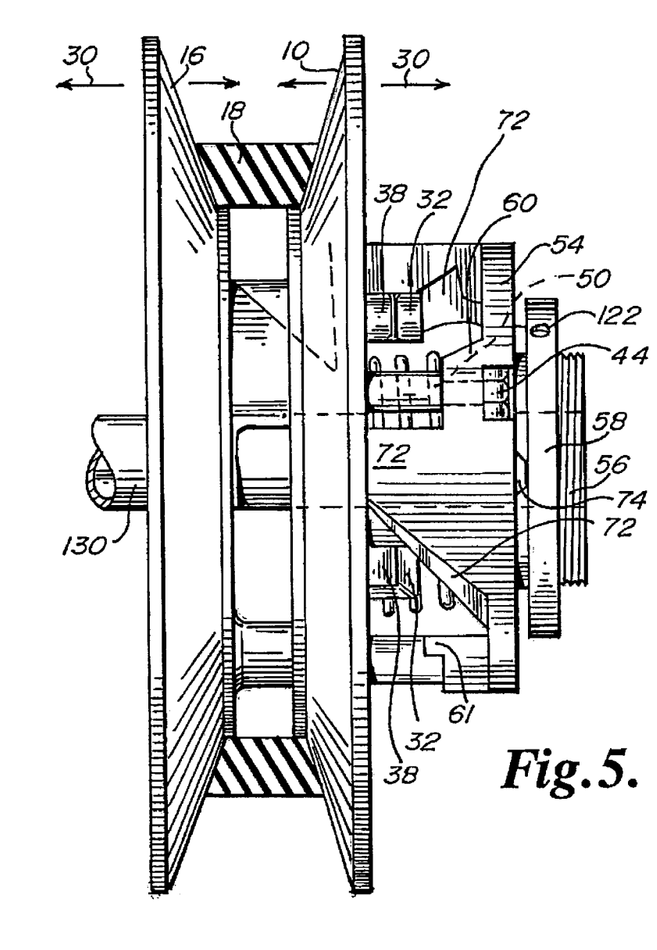
FIG. 5 is a detailed side view of the adjustable helix as engaged to the driven or secondary clutch during operation of a snowmobile.

As depicted in FIGS. 5 and 7, and as shown in phantom line in FIG. 3, as the outer dial collar 58 is rotated inwardly toward the base 54, the contact between the outer dial collar 58 and the feet 74 initiates the elevation of the adjustable ramps 70 relative to the ramp supports 72. As rotation of the outer dial collar 58 continues additional upward elevation of the adjustable ramps 70 occurs. During elevation, the feet 74 of the adjustable ramps 70 move forwardly and inwardly as represented by arrow 114 of FIG. 3 within the arcuate apertures 86. When the outer dial collar 58 is fully engaged for positioning adjacent to the base 54, the adjustable ramps 70 and are moved to a second fully engaged position where the second bushing faces 186 are elevated to a maximum point relative to first bushing faces 184. In this second fully engaged position, the forward tangs 104 are positioned adjacent to the exterior edges 116 of the arcuate or kidney-shaped apertures 86. It should be noted that the forward tangs 104 in the second fully engaged position are also preferably adjacent to the front arcuate edges 118 of the arcuate or kidney-shaped apertures 86. The elevation of the second bushing faces 186 relative to the first bushing faces 184 is illustrated in FIG. 7. It should be noted that the rotation of the outer dial collar 58 preferably simultaneously and uniformly moves all of the adjustable ramps 70 forwardly and upwardly with respect to the first bushing surface 184 of the ramp supports 72. In this second fully engaged position, a less steep angle of incline is provided for the adjustable ramps 70 relative to the ramp supports 72.

The feet 74 of the adjustable ramps 70 are preferably also arcuate or kidney-shaped for positioning within the arcuate or kidney-shaped apertures 86. The rotation of the outer dial collar 58 toward the base 54 elevates the forward tangs 104 within the arcuate or kidney-shaped apertures 86.

Referring to FIG. 2, as the outer dial collar 58 is rotated inwardly about the throat 56, the leading surface of the outer dial collar 58 engages the first flat surfaces 76 of the feet 74. As further inward rotation of the outer dial collar 58 occurs, the feet 74 of the adjustable ramps 70 elevate. The contact between the feet 74 and outer dial collar 58 then progresses toward the transition point 80 as further rotation of the outer dial collar 58 occurs. Proximate to the transition point 80, the adjustable ramps 70 are being elevated with respect to the ramp supports 72. As further rotation of the outer dial collar 58 occurs, the feet 74 are elevated beyond the transition point 80 onto the second inclined surface 78. At such time as the outer dial collar 58 is completely rotated to elevate the feet 74 and adjustable ramps 70 to the maximum level, the second inclined surfaces 78 will preferably be in flush contact with the outer dial collar 58.

It should be noted that inward rotation of outer dial collar 58 causes all of the feet 74 to elevate simultaneously and equally. Therefore, all of the inclines for the adjustable ramps 70 are identical and are elevated or lowered by a corresponding uniform amount.

Each of the adjustable ramps 70 preferably include a substantially triangular shaped horizontal shelf 120 which is preferably positioned exterior to the forward tangs 104 underneath the leading edges 106. The triangular shaped horizontal shelves 120 flushly engage the base 54 which function as a stop to align the adjustable ramps 70 to the ramp supports 72 when the adjustable ramps 70 are in the first non-elevated position.

As depicted in FIG. 7, the outer dial collar 58 is preferably rotated for elevation of the adjustable ramps 70 to the second fully elevated position where the outer dial collar 58 is engaged to the second inclined surfaces 78 of the feet 74. The outer dial collar 58 may be rotated for elevation of the adjustable ramps 70 to any desired position between the first lowered position and the second fully engaged position as desired by an individual. An infinite variety of positions is available for elevation of the adjustable ramps 70 above the ramp supports 72 as desired by an individual.

Referring to FIGS. 3 and 6, the top shelves 102 of the adjustable ramps 70 and top shelves 92 of the ramp supports 72 each include aligned apertures 68 therethrough. Preferably a nut and bolt, pin, or screw 94 pivotally attaches the adjustable ramps 70 to the ramp supports 72 proximate to the top shelves 102 and 92 respectively. The apertures 68 through each of the top shelves 102 and 92 each preferably have a bushing 182 to reduce friction between the pin or screw 94 and the apertures 68.

Figures 8, 10:
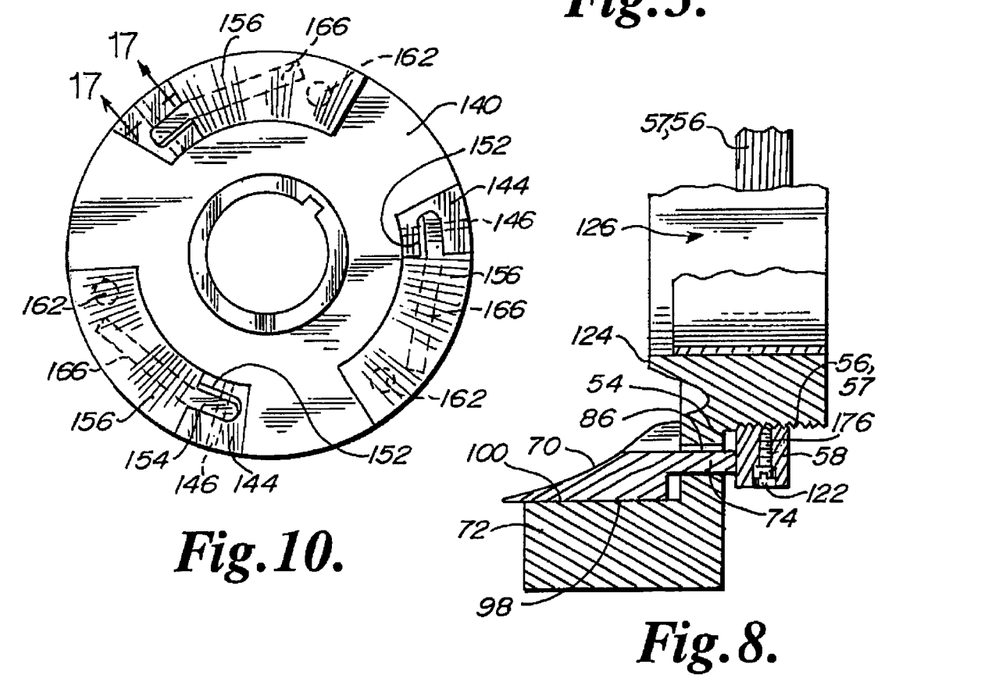
FIG. 8 is a detailed cross-sectional side view of the adjustable helix taken along the line of 8—8 of FIG. 3.
FIG. 10 is a cross-sectional top view of the alternative adjustable helix taken along the line of 10—10 of FIG. 9.

Referring to FIG. 8, the ramp supports 72 and outer dial collar 58 are depicted in cross section. The ramp supports 72 are shown to be in flush contact with the adjustable ramps 70. As is apparent in FIG. 8, the straight interior edge 98 of each helix ramp 72 is in flush engagement to the straight adjacent wall and edge 100 of an adjacent adjustable ramp 70. The oversizing of the arcuate or kidney-shaped apertures 86 is apparent relative to the feet 74 of the adjustable ramps 70. The outer dial collar 58 is shown to be threadably engaged to the throat 56. The outer dial collar 58 may be secured in a desired location relative to the throat 56 by the tightening of a set screw 122. It should be noted that the set screw 122 is preferably engaged to the non-threaded surface 132. However, the set screw 122 may be engaged to the threaded portion 57 of the throat 56 when a nylon or rubber insert is utilized to avoid causing damage to the threads 57 of the throat 56. Alternatively, the set screw 122 may be adapted for tightening engagement to the throat 56 at a location where threads are absent. The base 54 of the adjustable ramp helix also preferably includes a central collar 124 defining an opening 126 adapted to receive a shaft (not shown).

Referring to FIG. 6, it should be noted that the inner walls 128 of the adjustable ramps 70 are preferably arcuate and are substantially parallel to the arcuate exterior edges 96 of the ramp supports 72.

Referring to FIG. 5, the driven or secondary clutch 12 is depicted during an open throttle condition where the sheaves 16 have been moved outwardly according to arrow 30. During open throttle conditions, the spring 50 is compressed due to the outward movement of the sheaves 16 in response to the drawing of the V-belt 18 toward the center of the sheaves 16. In this instance, the bushings 32 are moved outwardly and upwardly along the adjustable ramps 70 to facilitate shifting of the transmission of the snowmobile 14. The outer dial collar 58 in this figure is shown to be in engagement with the feet 74 of the adjustable ramps 70. Also shown in FIG. 5 is the affixation of the adjustable ramp helix to the driven or secondary clutch 12 via the engagement of the nuts 44 to the threaded posts 42.

Figure 9:
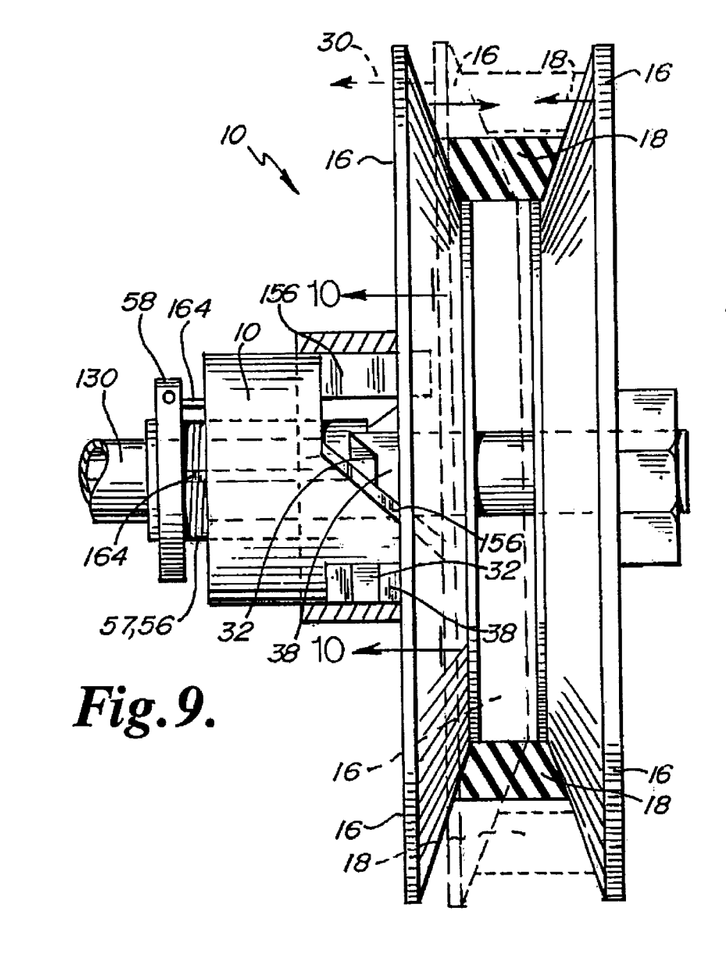
FIG. 9 is an alternative embodiment of the adjustable helix as engaged to the driven or secondary clutch 12.
Figure 11:
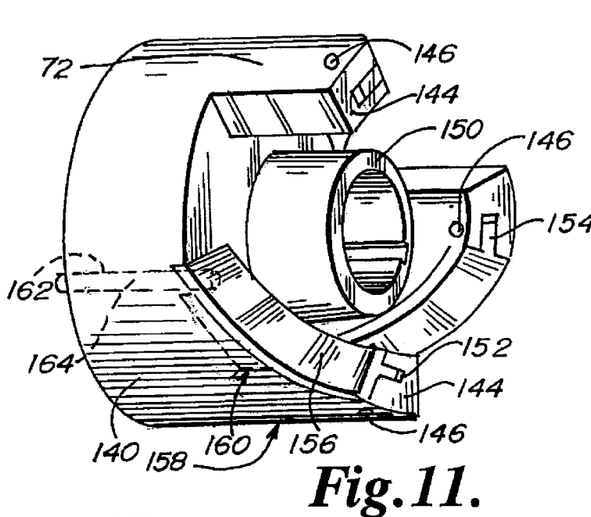
FIG. 11 is an isometric view of an alternative embodiment of the adjustable helix.
Figure 11A:
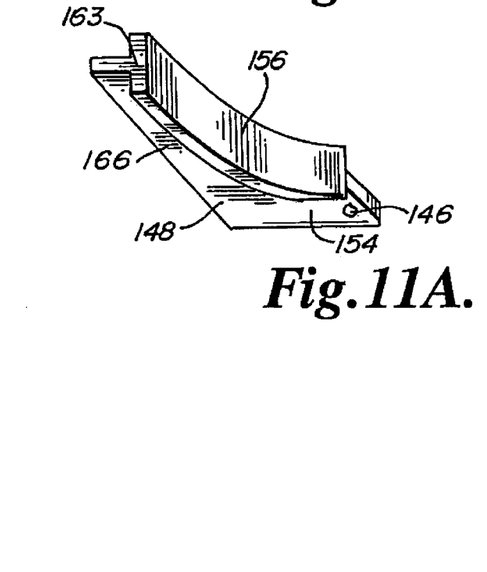
FIG. 11A is a detail view of an alternative embodiment of an adjustable ramp.

In an alternative embodiment the adjustable ramp helix may be engaged to the opposite or internal side of the driven or secondary clutch 12. One embodiment showing engagement to the clutch 12 proximate to the engine 24 is depicted in FIGS. 9 and 11. In this embodiment, the adjustable ramp helix is positioned interior to the driven or secondary clutch 12 adjacent or proximate to the engine 24 below the clutch and belt guard 26 of the snowmobile 14. The adjustable ramp helix may be engaged to the driven or secondary clutch 12 proximate to or away from the engine 24 depending on the make of vehicle and type of clutch 12 utilized.

As depicted in FIG. 11, the base 140 includes three regularly spaced, sized, and ramp supports 72. Each ramp support 72 preferably includes a top shelf 144 and an aperture 146 to facilitate pivotal affixation of an adjustable ramp 148 thereto. Each aperture 146 is preferably adapted to hold a bushing 182 and a nut and bolt, set screw and/or pin connector as earlier described. The base 140 preferably includes a central collar 150. Each ramp support 72 preferably includes a substantially vertical channel 152 which is adapted to receive a substantially vertical tongue 154 which is integral to each adjustable ramp 148. The adjustable ramps 148 preferably include a bushing face 156 which is substantially T-shaped relative to the vertical tongue 154.

In this embodiment, the ramp supports 72 include an arcuate exterior wall 158. Each ramp support 72 is adapted to receive the tongue 154 of an adjacent adjustable ramp 148.

In this embodiment, three elevator apertures 162 vertically traverses the base 140. The vertical elevator apertures 162 are preferably adapted to each receive an elevator pin 164. The elevator pins 164 preferably extend below the base 140 and are adapted for engagement to an elevator or outer dial collar 58. Elevation of the elevator, or rotation of the outer dial collar 58, engages the elevator pins 164 to urge the elevator pins 164 upwardly for engagement to a respective tongue 154 to elevate the adjustable ramps 148 relative to the ramp supports 72.

Referring to FIG. 9, the alternative adjustable ramp helix is shown engaged to the driven or secondary clutch 12. The alternative adjustable ramp helix is shown to surround a shaft 130. The adjustable ramp helix includes a throat 56 and an outer dial collar 58 as earlier described. The throat 56 may include an non-threaded surface 132 as earlier described. The outer dial collar 58 preferably raises or lowers the elevator pins 164 to either raise or lower the bushing faces 156 to desired angle of incline to assist the transmission of a snowmobile 14 during shifting. Referring to FIG. 9, as the V-belt 18 is drawn downwardly, the sheaves 16 separate, which in turn results in the bushings 32 ascending upwardly along a respective bushing face 156. It should be noted that the bushings 32 do not engage or ride upon the ramp supports 72 even when the adjustable ramps 70 are at the lowest first position. The bushings 32 preferably engage the adjustable ramps 70 during use of the adjustable helix 10. The angle of incline selected for the bushing faces 156 determines the speed of shifting for the transmission of the snowmobile 14.

Referring back to FIG. 11, it should be noted that the relationship between the vertical tongues 154 and the bushing face 156 may be substantially an inverted L-shape as opposed to a T-shape at the discretion of an individual without affecting the essential functions, features, and attributes described herein.

Referring to FIG. 10, the vertical channels 152 are preferably oversized with respect to the vertical tongues 154 to permit the pivotal elevation of the vertical tongues 154 relative to the ramp supports 72 via a nut and bolt, pin or set screw as positioned within the apertures 146. Each vertical tongue 154 may include an angled base portion 166 to facilitate engagement interior to a respective ramp support 142 as adjacent to the arcuate exterior wall 158.

Referring to FIGS. 9, 10, and 11, as the outer dial collar 58 is rotated inwardly about the throat 56, the leading surface of the outer dial collar 58 engages the elevator pins 164. As further rotation of the outer dial collar 58 occurs, the elevator pins 164 elevate for contact with either the T-supports 163 or vertical tongues 154. The contact between the elevator pins 164 and the outer dial collar 58 in turn elevates the adjustable ramps 148 and bushing faces 156 upwardly relative to the ramp supports 72. As further rotation of the outer dial collar 58 occurs, the elevator pins 164 continue to progress upwardly. At such time as the outer dial collar 58 is completely rotated to elevate the elevator pins 164 to the maximum level, the adjustable ramps 148 and bushing faces 156 will be positioned to establish the lowest angle of incline available to a user for shifting of a snowmobile transmission.

Figure 12:
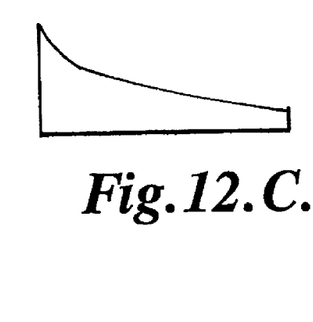
FIG. 12A is a detailed side view of a variable adjustable ramp.
FIG. 12B is an alternative detail side view of a variable adjustable ramp.
FIG. 12C is an alternative detail side view of a variable adjustable ramp.
FIG. 12D is an alternative detail side view of a variable adjustable ramp.
Figure 12A:
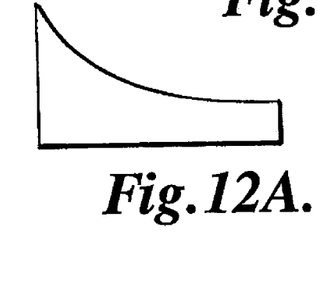
Figure 12B:
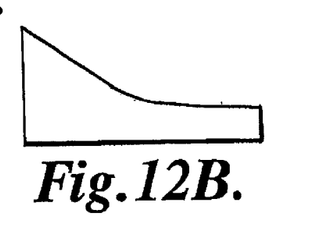
Figure 12D:
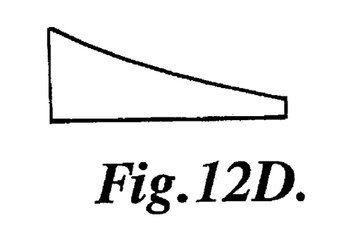

As depicted in FIGS. 12A–12D, the angle of incline for the ramp supports 72, adjustable ramps 70, or bushing faces 156 may be variable at the discretion of an individual. A variable ramp is one which does not include a uniform or arcuate transition between a top portion proximate to the top shelf and the base. As depicted in FIG. 12B, a variable ramp would include a first flat or angled portion proximate to a base and a second steeper angled portion proximate to a top shelf.

In an alternative embodiment, the elevator 58 may individually. raise or lower the adjustable ramps 70 consecutively to an equal desired angle of incline relative to the bushings 32. In this embodiment the elevator 58 is not required to simultaneously raise all the adjustable ramps 70. However, it should be noted that the elevator 58 is required to raise all of the adjustable ramps 70 to an exact level to avoid uneven wear on the bushings 32 and clutch 12. In this embodiment the transition members 73 may be either a foot 74 or an elevator pin 164 as preferred by an individual.

The elevator 58 may be used to either raise or lower the adjustable ramps 70 relative to the ramp supports 72. In an alternative embodiment, the adjustable ramps 70 may be initially set in the second, most elevated position, where the elevator 58 may be manipulated to lower the adjustable ramps 70 to provide a desired angle of incline. In this embodiment a return, spring, or actuating member may be provided to automatically position the adjustable ramps 70 to the second elevated position upon the release of the elevator 58. In an alternative embodiment, a return, spring, and/or actuating member may be utilized to automatically position the adjustable ramps 70 to the lowered first position upon the release of the elevator 58. In another alternative embodiment the elevator 58 may be required to be manipulated to either raise or to lower the adjustable ramps 70 to an angle of incline as preferred by an individual.

An alternative embodiment is depicted in FIGS. 13 and 14. In this embodiment, the adjustable ramps 202 are pivotally engaged to the ramp supports 204 which extend outwardly from the base 200. The base 200 includes a central throat 206 which may be adapted to surround a shaft of the snowmobile 14. The exterior surface of the central throat 206 may either be threaded or non-threaded at the preference of an individual.

A plurality of first pins 208 preferably function as the transition members 73 passing through apertures 86 traversing the base 200. The first pins 208 are preferably positioned between the adjustable ramps 202 and the elevator platform 210.

The base 200 has an exterior wall 212 defining an internal cavity 214. The interior of the cavity 214 is preferably threaded as identified by numeral 216. The elevator platform 210 preferably has a central opening for surrounding the shaft or central throat 206. The elevator platform 210 has a distal circumferential end 218 which is preferably threaded and is adapted to rotatably engage the threaded cavity 216. The elevator platform 210 is preferably adapted to be freely rotatable within the interior of the cavity 214. The elevator platform 210 also preferably includes a plurality of holes 220 therethrough. The elevator platform 210 has a first engagement surface 222 which is preferably adapted for contact with the first pins 208 which in turn are used to elevate the adjustable ramps 202 with respect to the ramp supports 204. The first engagement surface 222 is preferably smooth and may be coated with a friction reducing material to facilitate the circular or arcuate contact with the first pins 208 during rotation of the elevator platform 210.

An outer collar 224 is preferably rotatably engaged to the exterior of the wall 212. The outer collar 224 preferably has a plurality of securely affixed rotational pins 226 extending inwardly into the cavity 214. Each of the rotational pins 226 is preferably adapted for positioning through one of the holes 220. Rotation of the outer collar 224 thereby transfers rotational motion from the outer collar 224 to the elevator platform 210 through the rotational pins 226. The rotational pins 226 preferably slide through the holes 220 which may be coated with a friction reducing material at the preference of an individual. The rotation of the elevator platform 210 in turn causes the first pins 208 to elevate or lower the adjustable ramps 202. The exterior surface of the outer collar 224 may be knurled 180 at the preference of an individual to facilitate grasping and manipulation thereof. The outer collar 224 may be rotatably engaged to the exterior wall 212 through the use of a rail and pin 228 which may include ball bearings to facilitate positioning of the outer collar 224 relative to the base 200.

The exterior wall 212 may include a positioning cavity 230 adapted to hold a spring 232 and detente ball 234. The interior of the outer collar 224 may also include a track 236 having a plurality of positioning recesses 168 as depicted in FIG. 14.

A travel limiter 238 may traverse the outer collar 224 for engagement to the exterior wall 212 to restrict rotation of the outer collar 224 relative to the exterior wall 212 at the discretion of an individual.

The spring 232 and detente ball 234 are preferably adapted for adjustable positioning within the track 236. The detente ball 234 is preferably seated within one of the plurality of positioning recesses 168 to assist in the retention of the outer collar 224 in a desired position relative to the base 200 to provide a desired level of elevation or incline for the adjustable ramps 202. The first pins 208 freely slide upon the first engagement surface 222 in a circular configuration when viewed from above. The rotational pins 226 freely slide within the holes 220 to permit movement of the elevator platform 210 inwardly toward or outwardly away from the adjustable ramps 202. The first pins 208 and the rotational pins 226 are preferably offset with respect to each other to avoid contact, which could interfere with the free rotation of the elevator platform 210 within the cavity 214.

The adjustable ramp helix may also be either electronically and/or hydraulically coupled to a power source such as a motor or pump to engage the elevator 58 to eliminate the necessity for manual manipulation. In this embodiment, the vehicle may include a switch adjacent to a handlebar and/or steering column which may be activated by an individual. The engagement of the switch in turn preferably provides a signal to the motor or pump to initiate movement of the elevator 58 for elevation or lowering of the adjustable ramps 70.

A vehicle may further include a temperature censor and/or altimeter, or the vehicle may include an input device where an individual may enter data such as altitude, temperature, and/or snow or environmental conditions. The censors and/or input device may be in communication with a microprocessor which in turn may process the data and automatically communicate a signal to the motor or pump to elevate or lower the elevator 58 to an optimal angle of incline for the adjustable ramps 70.

It should be further noted that the use of an adjustable ramp helix as described herein may be adapted for use with four-wheel all-terrain vehicles, watercraft, or automobiles via the use of hydraulic assists and servo motors as connected to a controller and computer to sense environmental conditions for signaling of required transmission adjustments to manipulate the adjustable ramp helix 10.

The present invention may be embodied in other specific forms without departing from the spirit or essential attributes thereof; and it is, therefore, desired that the present embodiment be considered in all respects as illustrative and not restrictive, reference being made to the appended claims rather than to the foregoing description to indicate the scope of the invention.

I claim:

1. An adjustable ramp helix comprising:
   a. a base having a plurality of vertically adjustable ramps, said vertically adjustable ramps being adjustable between at least two positions relative to said base; and
   b. an elevator operatively connected to said vertically adjustable ramps, whereby said elevator simultaneously alters the position of said vertically adjustable ramps relative to said base and relative to a hub having bushing chairs.

2. The adjustable ramp helix according to claim 1, said base further comprising a plurality of apertures.

3. The adjustable ramp helix according to claim 2, further comprising a transition member positioned between the elevator and the adjustable ramps, wherein movement of said elevator toward said base elevates said adjustable ramps.

4. The adjustable ramp helix according to claim 3, said transition member comprising: a foot engaged to each of said adjustable ramps, each of said feet adapted for positioning within one of said apertures.

5. The adjustable ramp helix according to claim 4, said base further comprising a throat.

6. The adjustable ramp helix according to claim 5, said elevator comprising a collar at least partially surrounding said throat, said collar moveable relative to said throat whereby positioning of said collar elevates said adjustable ramps relative to said base.

7. The adjustable ramp helix according to claim 6, said base further comprising:
   a plurality of ramp supports, wherein each adjustable ramp is engaged to one of said ramp supports.

8. The adjustable ramp helix according to claim 7, wherein said adjustable ramps are pivotally engaged to said ramp supports.

9. The adjustable ramp helix according to claim 6, said throat comprising a threaded section, said collar rotatably engaged to said threaded section wherein rotation of said collar toward said base elevates said adjustable ramps.

10. The adjustable ramp helix according to claim 3, said transition member comprising an elevator pin positioned within each of said apertures.

11. The adjustable ramp helix according to claim 10, said base further comprising a throat.

12. The adjustable ramp helix according to claim 11, said elevator comprising a collar at least partially surrounding said throat, said collar moveable relative to said throat whereby movement of said collar elevates said adjustable ramps.

13. The adjustable ramp helix according to claim 11, said elevator comprising a collar at least partially surrounding said throat, said collar moveable relative to said throat whereby movement of said collar lowers said adjustable ramps.

14. The adjustable ramp helix according to claim 13, said throat comprising a threaded section, said collar rotatably engaged to said threaded section wherein rotation of said collar towards said base elevates said adjustable ramps.

15. The adjustable ramp helix according to claim 13, said throat comprising a threaded section, said collar rotatably engaged to said threaded section wherein rotation of said collar away from said base lowers said adjustable ramps.

16. An adjustable ramp helix comprising:
   a. a base having a plurality of ramp supports an adjustable ramp engaged to each ramp support, and a plurality of apertures traversing the base, each of said adjustable ramps having a foot adapted for positioning within one of said apertures and an arcuate vertically and arcuate laterally bushing face, said base further having a throat having a threaded section; and
   b. an elevator comprising a collar rotatably connected to said threaded section, said collar in contact with said feet, said collar adapted for rotation with respect to said throat to alter the elevation of said adjustable ramps relative to said base, said elevator further comprising a positioner said positioner adapted to restrict rotation of said collar relative to said throat.

* * * * *